(12) United States Patent
Klein et al.

(10) Patent No.: US 12,147,764 B2
(45) Date of Patent: Nov. 19, 2024

(54) SIMILARITY SCORING LEVERAGING CONSTRAINED GREEDY MATCHING

(71) Applicant: SAP SE, Walldorf (DE)

(72) Inventors: Tassilo Klein, Berlin (DE); Moin Nabi, Berlin (DE)

(73) Assignee: SAP SE, Walldorf (DE)

( * ) Notice: Subject to any disclaimer, the term of this patent is extended or adjusted under 35 U.S.C. 154(b) by 277 days.

(21) Appl. No.: 17/335,828

(22) Filed: Jun. 1, 2021

(65) Prior Publication Data
US 2022/0382980 A1  Dec. 1, 2022

(51) Int. Cl.
*G06F 40/284* (2020.01)
*G06F 18/22* (2023.01)
*G06F 40/205* (2020.01)

(52) U.S. Cl.
CPC ............ *G06F 40/284* (2020.01); *G06F 18/22* (2023.01); *G06F 40/205* (2020.01)

(58) Field of Classification Search
CPC ...... G06F 40/284; G06F 18/22; G06F 40/205; G06F 40/30
See application file for complete search history.

(56) References Cited

U.S. PATENT DOCUMENTS

| | | | |
|---|---|---|---|
| 9,396,540 B1 * | 7/2016 | Sampson | G06T 7/74 |
| 2015/0331929 A1 * | 11/2015 | El-Saban | G06F 16/3329 |
| | | | 707/739 |
| 2020/0371851 A1 * | 11/2020 | Liu | G06F 8/62 |
| 2021/0294974 A1 * | 9/2021 | Gao | G06F 40/166 |

OTHER PUBLICATIONS

Abdou, M. et al., "The Sensitivity of Language Models and Humans to Winograd Schema Perturbations," Proc. of the 58th Annual Meeting of the Association for Computational Linguistics, pp. 7590-7604 (Jul. 5-10, 2020).
Chen, T. et al., "A Simple Framework for Contrastive Learning of Visual Representations," downloaded from https://arxiv.org/pdf/2002.05709.pdf, 20 pages (Jul. 1, 2020).
Cui, L. et al., "Does BERT Solve Commonsense Task via Commonsense Knowledge?" downloaded from https://arxiv.org/pdf/2008.03945v1.pdf, 15 pages (Aug. 10, 2020).
Devlin, J. et al., "BERT: Pre-training of Deep Bidirectional Transformers for Language Understanding," downloaded from https://arxiv.org/pdf/1810.04805.pdf, 16 pages (May 24, 2019).

(Continued)

*Primary Examiner* — Richa Sonifrank
*Assistant Examiner* — Athar N Pasha
(74) *Attorney, Agent, or Firm* — Sterne, Kessler, Goldstein & Fox P.L.L.C.

(57) ABSTRACT

Disclosed herein are system, method, and computer program product embodiments for similarity scoring of sentences, while restricting distances between tokenized pairs in the sentences. An embodiment operates by determining a similarity of tokens between a first sequence of tokens and a second sequence of tokens to generate token pairs, determining a distance of relative positioning of token pairs in the first tokenized sequence and the second tokenized sequence and generating a score value that indicates the degree to which the first sentence matches the second sentence based on restricting matches to a maximum value of the distance of relative positions of the token pairs in the first tokenized sequence and the second tokenized sequence.

14 Claims, 5 Drawing Sheets

(56) References Cited

OTHER PUBLICATIONS

Emami, A. et al., "The KnowRef Coreference Corpus: Removing Gender and Number Cues for Difficult Pronominal Anaphora Resolution," Proc. of the 57th Annual Meeting of the Association for Computational Linguistics, pp. 3952-3961 (Jul. 28-Aug. 2, 2019).
Grill, J. et al., "Bootstrap Your Own Latent A New Approach to Self-Supervised Learning," 34th Conf. on Neural Information Processing Systems (NeurIPS 2020), Vancouver, Canada, 14 pages (2020).
Gruber, T.R., "Toward principles for the design of ontologies used for knowledge sharing," Int. J. Human-Computer Studies, vol. 43, pp. 907-928 (1995).
He, K. et al., "Momentum Contrast for Unsupervised Visual Representation Learning," IEEE/CVF Conf. on Computer Vision and Pattern Recognition (CVPR), pp. 9726-9735 (2020).
He, P. et al., "A Hybrid Neural Network Model for Commonsense Reasoning," Proc. of the First Workshop on Commonsense Inference in Natural Language Processing, pp. 13-21 (Nov. 3, 2019).
Kavumba, P. et al., "When Choosing Plausible Alternatives, Clever Hans can be Clever," Proc. of the First Workshop on Commonsense Inference in Natural Language Processing, pp. 33-42 (Nov. 3, 2019).
Klein, T. & Nabi, M., "Attention is (not) All You Need for Commonsense Reasoning," Proc. of the 57th Annual Meeting of the Association for Computational Linguistics, pp. 4831-4836 (Jul. 28-Aug. 2, 2019).
Klein, T. & Nabi, M., "Contrastive Self-Supervised Learning for Commonsense Reasoning," Proc. of the 58th Annual Meeting of the Association for Computational Linguistics, pp. 7517-7523 (Jul. 5-10, 2020).
Kocijan, V. et al., "A Surprisingly Robust Trick for the Winograd Scherna Challenge," Proc. of the 57th Annual Meeting of the Association for Computational Linguistics, pp. 4837-4842 (Jul. 28-Aug. 2, 2019).
Kocijan, V. et al., "A Review of Winograd Scherna Challenge Datasets and Approaches," downloaded from https://arxiv.org/pdf/2004.13831.pdf, 7 pages (Apr. 23, 2020).
Levesque, H.J. et al., "The Winograd Schema Challenge," Proc. of the Thirteenth International Conference on Principles of Knowledge Representation and Reasoning, pp. 552-561 (2012).
Liu, H. et al., "Precise Task Formalization Matters in Winograd Schema Evaluations," Proc. of the 2020 Conference on Empirical Methods in Natural Language Processing, pp. 8275-8280 (Nov. 16-20, 2020).
Liu, Y. et al., "RoBERTa: A Robustly Optimized BERT Pretraining Approach," downloaded from https://arxiv.org/pdf/1907.11692.pdf, 13 pages (Jul. 26, 2019).
Marcus, G., "The Next Decade in AI: Four Steps Towards Robust Artificial Intelligence," downloaded from https://arxiv.org/ftp/arxiv/papers/2002/2002.06177.pdf, 59 pages (Feb. 17, 2020).
Rahman, A. et al., "Resolving Complex Cases of Definite Pronouns: The Winograd Schema Challenge," Proc. of the 2012 Joint Conference on Empirical Methods in Natural Language Processing and Computational Language Learning, pp. 777-789 (2012).
Ruan, Y. et al., "Exploring Unsupervised Pretraining and Sentence Structure Modelling for Winograd Schema Challenge," downloaded from https://arxiv.org/pdf/1904.09705.pdf, 7 pages (Apr. 22, 2019).
Saba, W. S., "Is there a 'Simple' Machine Learning Method for Commonsense Reasoning?" downloaded from https://arxiv.org/ftp/arxiv/papers/1810/1810.00521.pdf, 4 pages (Oct. 1, 2018).
Sakaguchi, K. et al., "WinoGrande: An Adversarial Winogra Schema Challenge at Scale," downloaded from https://arxiv.org/pdf/1907.10641.pdf, 9 pages (Nov. 21, 2019).
Tamborrino, A. et al., "Pre-training is (Almost) All You Need: An Application to Commonsense Reasoning", downloaded from https://arxiv.org/pdf/2004.14074.pdf, 10 pages (Apr. 29, 2020).
Trichelair, P. et al., "On the Evaluation of Common-Sense Reasoning in Natural Language Understanding," downloaded from https://arxiv.org/pdf/1811.01778v1.pdf, 7 pages (Nov. 5, 2018).
Trichelair, P. et al., "How Reasonable are Common-Sense Reasoning Tasks: A Case-Study on the Winograd Schema Challenge and SWAG," Proc. of the 2019 Conference on Empirical Methods in Natural Language Processing and the 9th International Joint Conference on Natural Language Processing, pp. 3382-3387 (Nov. 3-7, 2019).
Trinh, T.H. and Le, Q.V., "A Simple Method for Commonsense Reasoning," downloaded from https://arxiv.org/pdf/1806.02847.pdf, 12 pages (Sep. 26, 2019).
Vaswani, A. et al., "Attention is All You need," 31st Conference on Neural Information Processing Systems (NIPS2017), 11 pages (2017).
Ye, Z. et al., "Align, Mask and Select: A Simple Method for Incorporating Commonsense Knowledge into Language Representation Models," https://arxiv.org/pdf/1908.06725v4.pdf, 8 pages (Nov. 12, 2019).
Zhang, T. et al., "BERTScore: Evaluating Text Generation with BERT," ICLR 2020, 43 pages (2020).
U.S. Appl. No. 17/335,823, filed Jun. 1, 2021, entitled "Contrastive Meta-Learning for Zero-Shot Learning".

\* cited by examiner

SIMILARITY SCORING LEVERAGING CONSTRAINED GREEDY MATCHING

BACKGROUND

Similarity scoring of sentences is an essential task in natural language processing. Precise metrics find numerous applications ranging from chatbots, databases searches to online help desks (ticket finding), each improving the user experience. Approaches that feature good text scoring metrics allow systems a more human feel without overloading the user with too many outliers. However, similarity scoring systems often produce semantically inconsistent scoring. Specifically, empirical results of matching sentences of semantic variations have shown overconfident scores.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for scoring the similarity of two sentences.

In some embodiments, the technology described herein restricts sentence similarity matching heuristics by integrating a semantic variability restriction. This integrating of a semantic variability restriction is based on a language model following strict rules and allows preservation of these semantics with respect to limited variability.

In some embodiments, the technology described herein includes matching heuristics to incorporate constraint in order to avoid semantically inconsistent scoring.

In some embodiments, the scoring system integrates semantic variability restriction into matching methodologies. Matching heuristics may incorporate constraint in order to avoid semantically inconsistent scoring. Specifically, empirical results of matching sentences of semantic variations have shown that too much flexibility in matching tokens can lead to shortcuts and over-confident scores.

Figure 1:
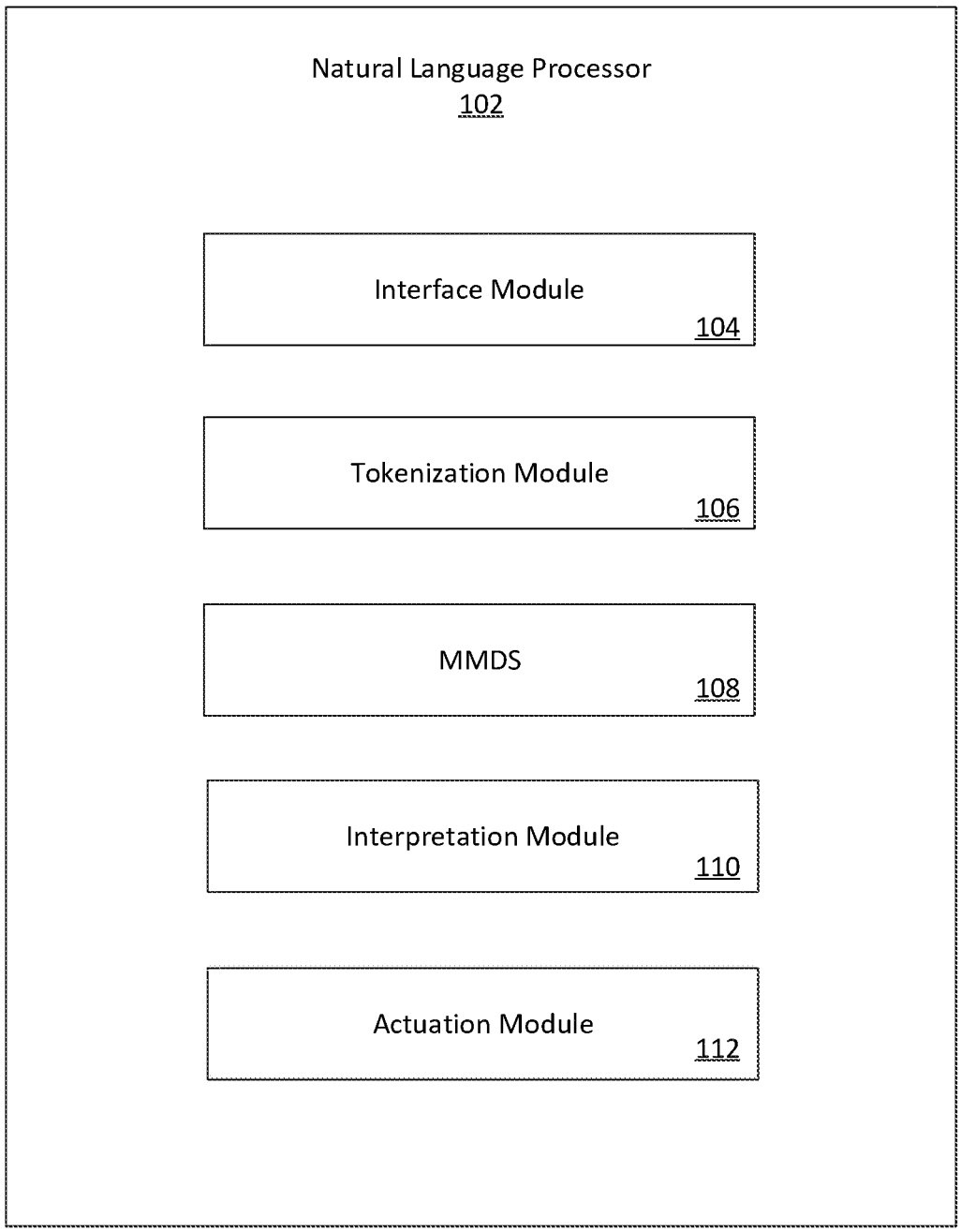
FIG. 1 is a block diagram of a natural language processing system, according to some embodiments.

FIG. 1 is a block diagram of a system 100, according to some embodiments. The number of components in system 100 is not limited to what is shown and other variations in the number of arrangements of components are possible, consistent with some embodiments disclosed herein. The components of FIG. 1 may be implemented through hardware, software, and/or firmware. As illustrated, system 100 may comprise a Natural Language Processor (NLP) 102.

NLP 102 may include any device, mechanism, system, network, and/or compilation of instructions for performing natural language sentence matching consistent with the technology described herein. In the configuration illustrated in FIG. 1, NLP 102 may include an interface module 104, a tokenization module 106, a Master and Meta Data Search (MMDS) module 108, and interpretation module 110, and an actuation module 112. In certain embodiments, module 104, 106, 108, 110, and 112 may each be implemented via any combination of hardware, software, and/or firmware.

Interface module 104 may serve as entry point or user interface through which one or more sentences can be entered for subsequent similarity scoring (matching). In certain embodiments, interface module 104 may facilitate information exchange among and between NLP 102 and one or more users and/or systems. Interface module 104 may be implemented by one or more software, hardware, and/or firmware components. Interface module 104 may include one or more logical components, processes, algorithms, systems, applications, and/or networks. Certain functions embodied by interface module 104 may be implemented by, for example, HTML, HTML with JavaScript, C/C++, Java, etc. Interface module 104 may include or be coupled to one or more data ports for transmitting and receiving data from one or more components coupled to NLP 102. Interface module 102 may include or be coupled to one or more user interfaces (e.g., a GUI).

In certain configurations, interface module 104 may interact with one or more applications running on one or more computer systems. Interface module 104 may, for example, embed functionality associated with components of NLP 102 into applications running on a computer system. In one example, interface module 104 may embed NLP 102 functionality into a Web browser or interactive menu application with which a user interacts. For instance, interface module may embed GUI elements (e.g., dialog boxes, input fields, textual messages, etc.) associated with NLP 102 functionality in an application with which a user interacts. Details of applications with which interface module 104 may interact are discussed below in connection with FIGS. 2-4.

In certain embodiments, interface module 104 may include, be coupled to, and/or integrate one or more systems and/or applications, such as speech recognition facilities and Text-To-Speech (TTS) engines. Further, interface module 104 may serve as an entry point to one or more voice portals. Such a voice portal may include software and hardware for receiving and processing instructions from a user via voice. The voice portal may include, for example, a voice recognition function and an associated application server. The voice recognition function may receive and interpret dictation, or recognize spoken commands. The application server may take, for example, the output from the voice recognition function, convert it to a format suitable for other systems, and forward the information to those systems.

Consistent with embodiments of the present invention, interface module 104 may receive natural language queries (e.g., sentences) from a User and forward the queries to tokenization module 106.

Tokenization module 106 may transform natural language queries into semantic tokens. Tokenization module 106 may be implemented by one or more software, hardware, and/or firmware components. Tokenization module 104 may include one or more logical components, processes, algorithms, systems, applications, and/or networks. Tokenization module 106 may include stemming logic, combinatorial intelligence, and/or logic for combining different tokenizers for different languages. In one configuration, tokenization module 106 could receive an ASCII string and output a list of words. Tokenization module 106 may transmit generated tokens to MMDS module 108 via standard machine-readable formats, such as the expendable Markup Language (XML).

MMDS module 108 may be configured to retrieve information using tokens received from tokenization module 106. MMDS module 108 may be implemented by one or more software, hardware, and/or firmware components. MMDS module 108 may include one or more logical components, processes, algorithms, systems, applications, and/or networks. In one configuration, MMDS module 108 may include an API, a searching framework, one or more applications, and one or more search engines.

MMDS 108 may include an API, which facilitates requests to one or more operating systems and/or applications included in or coupled to MMDS module 108. For example, the API may facilitate interaction between MMDS 108 and one or more structured data archives (e.g., knowledge base).

In one configuration, MMDS 108 may include an API that is exposed to one or more business intelligence systems, such as a Business Warehouse (BW). Such business intelligence systems may include or be based on a data warehouse optimized for environments such as an environment from SAP. These business intelligence systems may include various databases, systems, and tools.

In certain embodiments, MMDS module 108 may be configured to maintain a searchable data index, including meta data, master data, meta data descriptions, and/or system element descriptions. For example, the data index may include readable field names (e.g., textual) for meta data (i.e., table names and column headers); master data (i.e., individual field values), and meta data descriptions. The data index may be implemented via one or more hardware, software, and/or firmware components. In one implementation, a searching framework within MMDS 108 may initialize the data index, perform delta indexing, collect meta data, collect master data, and administer indexing. Such a searching framework may be included in one or more business intelligence applications (e.g., helpdesk, chatbots, voice interactive modules, etc.)

In certain configurations, MMDS module 108 may include or be coupled to a low level semantic analyzer, which may be embodied by one or more software, hardware, and/or firmware components. The semantic analyzer may include components for receiving tokens from tokenization module 106 and identifying relevant synonyms, hypernyms, etc. In one embodiment, the semantic analyzer may include and/or be coupled to a table of synonyms, hypernyms, etc. The semantic analyzer may include components for adding such synonyms as supplements to the tokens.

Consistent with embodiments of the present invention, MMDS module 108 may leverage various components and searching techniques/algorithms to search the data index using tokens received by tokenization module 106. MMDS module 108 may leverage one or more search engines that employ partial/fuzzy matching processes and/or one or more Boolean, federated, or attribute searching components.

In certain configurations, MMDS module 108 may include and/or leverage one or more information validation processes. In one configuration, MMDS module 108 may leverage one or more languages for validating XML information. MMDS module 108 may include or be coupled to one or more clients that include business application subsystems.

In certain configurations, MMDS module 108 may include one or more software, hardware, and/or firmware components for prioritizing information found in the data index with respect to the semantic tokens. In one example, such components may generate match scores, which represent a qualitative and/or quantitative weight or bias indicating the strength/correlation of the association between elements in the data index and the semantic tokens.

In one configuration, MMDS module 108 may include one or more learning components to enhance searching efficiency. In one example, such a learning component may observe and/or log information requested by users and may build additional and/or prioritized indexes for fast access to frequently requested data. Learning components may exclude frequently requested information from the data index, and such MMDS data may be forwarded to and/or included in interpretation module 110.

MMDS module 108 may output to interpretation module 110 a series of meta and/or master data technical addresses, associated field names, and any associated description fields. MMDS module 108 may also output matching scores to interpretation module 110.

Interpretation module 110 may process and analyze results returned by MMDS module 108. Interpretation module 110 may be implemented by one or more software, hardware, and/or firmware components. Interpretation module 104 may include one or more logical components, processes, algorithms, systems, applications, and/or networks. In one example, interpretation module 104 may include an agent network, in which agents make claims by matching policy conditions against tokenized natural language queries and context information.

Consistent with embodiments of the present invention, interpretation module 110 may be configured to recognize uncertainties associated with information identified by MMDS 108. For example, interpretation module 110 may identify ambiguities, input deficiencies, imperfect conceptual matches, and compound commands. In certain configurations, interpretation module 110 may initiate, configure, and manage user dialogs; specify and manage configurable policies; perform context awareness processes; maintain context information; personalize policies and perform context switches; and perform learning processes.

Interpretation module 110 may be configured to interact with interface module 104 in order to resolve uncertainties. For instance, upon identifying an uncertainty, interpretation module 110 may initiate a dialog with a user via interface module 104. To facilitate such a dialog, interface module 110 may, for example, leverage one or more GUIs.

In operation, interpretation module 110 may interact with one or more other modules within NLP 102. In one example, interpretation module 110 may dynamically interact with MMDS module 108 (e.g., as searches are performed) in order to resolve uncertainties as they arise.

Interpretation module 110 may provide one or more winning combinations of data elements to actuation module 112. Interpretation module 110 may filter information identified by MMDS module 110 in order to extract information that is actually relevant to input sentences. That is, interpretation module 110 may distill information identified by MMDS module 108 down to information that is relevant to the sentences and in accordance with intent. Information provided by interpretation module 110 (i.e., winning combination of elements) may include function calls, meta data, and/or master data. In certain embodiments, the winning combination of elements may be arranged in specific sequence to ensure proper actuation. Further, appropriate relationships and dependencies among and between various elements of the winning combinations may be preserved/maintained. For example, meta and master data elements included in a winning combination may be used to populate one or more function calls included in that winning combination.

Actuation module 112 may process interpreted information provided by interpretation module 110. Actuation module 112 may be implemented by one or more software, hardware, and/or firmware components. Actuation module 112 may include one or more logical components, processes, algorithms, systems, applications, and/or networks. Actuation module 112 may be configurable to interact with one or more system environments.

Consistent with embodiments of the present invention, actuation module 112 may be configured to provide information to one or more users/systems. In such embodiments, actuation module may interact with one or more information display devices.

In certain embodiments, actuation module 112 may be configured to send requests to one or more devices and/or systems using, for example, various APIs. Actuation module 112 may generate one or more presentations based on responses to such commands.

For clarity of explanation, interface module 104, tokenization module 106, MMDS module 108, interpretation module 110, and actuation module 112 are described as discrete functional elements within NLP 102. However, it should be understood that the functionality of these elements and modules may overlap and/or may exist in fewer elements and modules. Moreover, all or part of the functionality of these elements may co-exist or be distributed among several geographically-dispersed locations.

Figure 2:
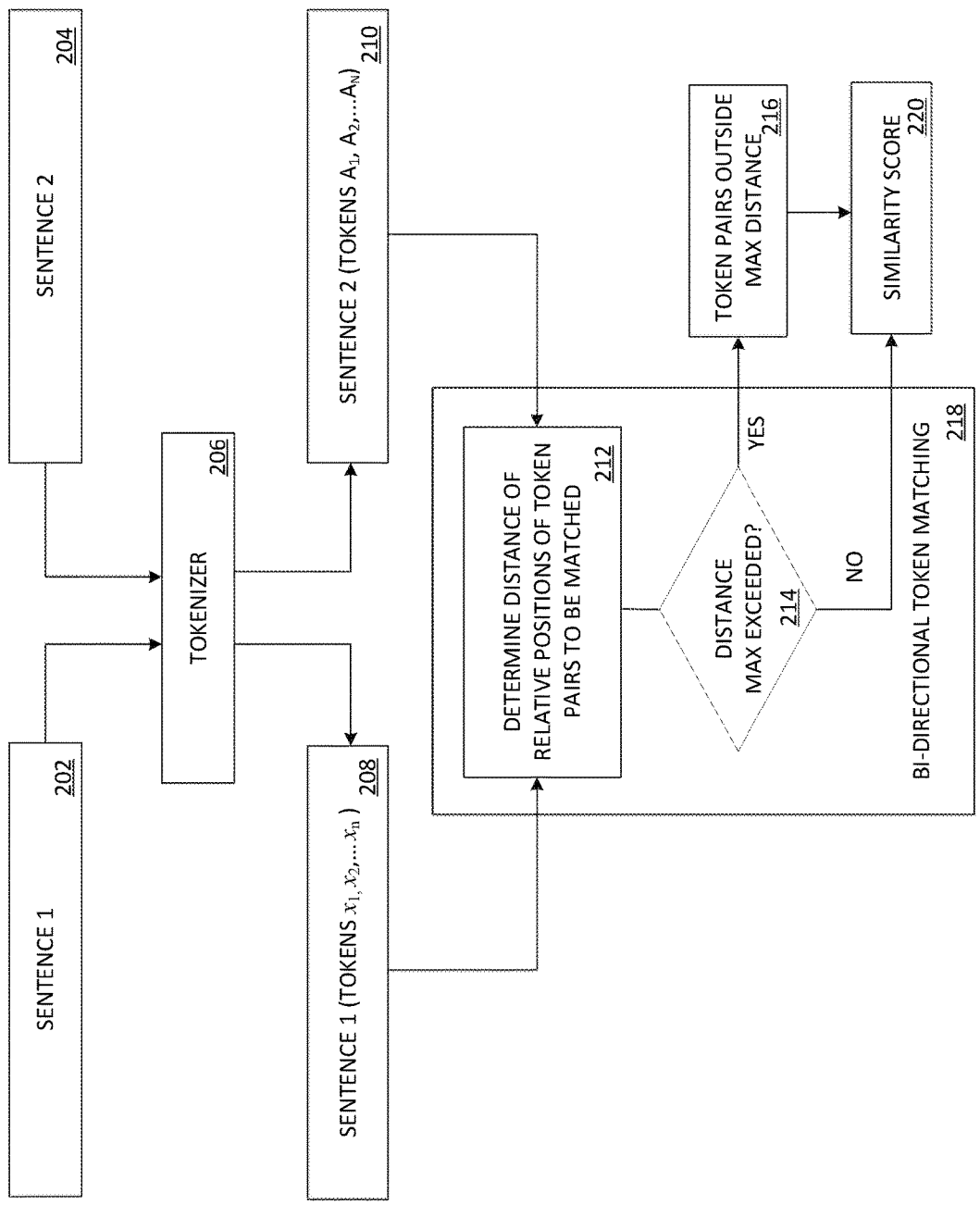
FIG. 2 is a flowchart illustrating a process for similarity scoring of sentences, according to some embodiments.

FIG. 2 is a flowchart illustrating a process for similarity scoring of sentences, according to some embodiments.

Method 200 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In some embodiments, when sentences (two or more) are to be compared to determine a potential similarity, each of the sentences are normalized to remove extraneous information (such as common words, like "the", "and", "a", etc.) and the remaining information (e.g., words or phrases) broken down into tokens. Tokenization normalizes natural language text by splitting a phrase, sentence, paragraph, or an entire text document into smaller units, such as individual words or terms. Each of these smaller units are called tokens. The tokens could be words, numbers or punctuation marks. For example, sentence 1 (202) and sentence 2 (204) are split into sequences of tokens (208 and 210) by tokenizer 206 (tokenization module 106).

Given a sentence $x \in S$ (a sentence x from the set of all sentences S), a language model specific (e.g., English) tokenizer generates a token sequence $(x_1, \ldots, x_n)$ (e.g., 208 or alternately labeled 210 $(A_1, \ldots, A_n)$). Instantiation of language models on the tokenized sequence yields a sequence of embedding vectors denoted as $(x_1, \ldots, x_n)$ with $x_i \in R^K$, where R represents token embeddings and K represents a dimensionality of the token embeddings. For example, BERTscore, a scoring method, leverages a cosine similarity of token embeddings obtained from transformer language models to instantiate a similarity notion.

As shown, scoring the similarity of two sentences is based on an analysis of tokenized versions of the sentences. First, sentence 1 (202) and sentence 2 (204) are input into tokenizer 206. Specifically, the system assumes the sentences are to be represented by a sequence of tokens.

The cosine similarity between token in $x_i$ and $\hat{x}_j$ is defined as:

$$\frac{x_i^T \hat{x}_j}{\|x_i\| \cdot \|\hat{x}_j\|}$$

Which, under an assumption of normalized vectors simplifies to $x_i^T \hat{x}_j$. Given that the tokenization procedure may change the length of the sequence, i.e., $|x| \neq |\hat{x}|$, the system employs bi-directional token matching 218. Token pairs are formed by pairing similar meaning words. For example a MMDS 108 may contain searching algorithms or semantic analyzers to pair tokens of similar meaning (including context). In some embodiments, the system may follow a scoring approach based on greedy token matching. Each token pair will have a position in its respective token sequence. For example, a first token is positioned third in first token sequence 208 and its corresponding paired token is positioned fourth in second token sequence 210. In 212, the system determines distances of these relative positions between paired tokens. However, in contrast to a BERTscore, the instant method/system restricts matching of paired tokens to a vicinity (distance) of each token position in a first sequence of tokens to its corresponding paired token's position in a second sequence of tokens. This distance restriction (constrained greedy matching) is described in greater detail in association with FIGS. 3-4.

Restrictive token matching is based on a language fundamental that sentences of a similar semantic context are typically not freely arrangeable (ease of arrangement) without altering the context. In some embodiments, where semantic variability is low, the system may be more restrictive (smaller differential in position distances between token sequences) and where semantic variability is higher, the system may be less restrictive. Therefore, providing a restriction in that context provides more stability and accuracy. Matching is restricted to nearby locations. Token pairs that are not located near (by position) each other (e.g., the designated restriction of maximum position distances 214) are recognized as tokens outside the max position distance 216 in the matching score.

Hence, the score of matching each token in x with a token in $\hat{x}$ is referred to recall measure (R), and the reverse as precision (P).

$$R = \frac{1}{|x|} \sum_{x_i \in x} \max_{\hat{x}_j \in \hat{x} \ s.t. \ |i-j| \leq B} x_i^T \hat{x}_j \quad (1)$$

$$P = \frac{1}{|\hat{x}|} \sum_{\hat{x}_i \in \hat{x}} \max_{x_j \in x \ s.t. \ |i-j| \leq B} \hat{x}_i^T x_j \quad (2)$$

Here B denotes band around the diagonal, i.e., the maximum distance tokens to be matched can have in their relative position. Integration of P and R yields the F1 measure $$F1 = 2\frac{P \cdot R}{P + R} \quad (3)$$

which reflects the mutual similarity of the embeddings.

Empirical results of matching of sentences of semantic variations with strong performance are typically with $2 \leq B \leq 6$.

Figure 3:
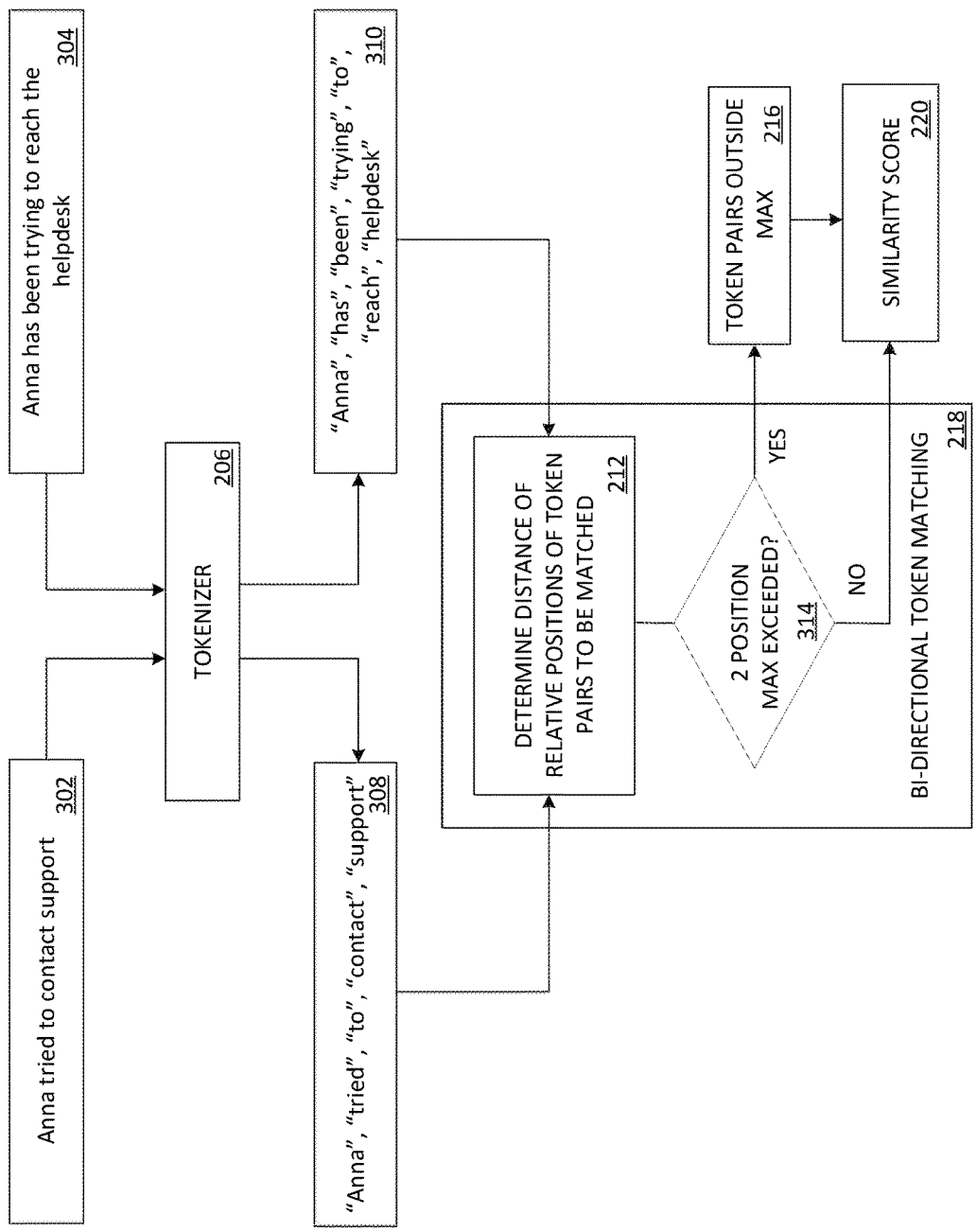
FIG. 3 is a flowchart illustrating a process for similarity scoring of sentences, according to some embodiments.

FIG. 3 is a flowchart illustrating a process for similarity scoring of sentences, according to some embodiments.

Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 2. However, method 300 is not limited to that example embodiment.

In this example embodiment, the system is scoring a similarity of two sentences describing Anna as trying to contact support/helpdesk. Sentence 1 (302), "Anna tried to contact support" is input into tokenizer 206 to generate corresponding tokens 308 "Anna", "tried", "to", "contact", "support". Sentence 2 (304), "Anna has been trying to reach the helpdesk" is input into tokenizer 206 to generate corresponding tokens 310 "Anna", "has", "been", "trying", "to", "reach", "helpdesk".

Given that the tokenization procedure may change the length of the sequence, i.e., length of tokenized sentence 1 (308) may not be equal to a length of tokenized sentence 2 (310), the system employs a bi-directional token matching 218 with score 220. In this regard, the system follows a scoring approach based on greedy token matching. However, the instant method restricts similarity scoring based on a vicinity of each token position. As shown, a distance is determined for relative positions of pairs to be matched 212. For example, the token pair position relative distances are: "Anna"/"Anna" (zero, same position), "tried"/"trying" (two positions away), "to"/"to" (two positions away), "contact"/"reach" (two positions away), "support"/"helpdesk" (two positions away). Tokens "has" and "been" were not paired within the designated restriction of two maximum positions 314 and therefore are recognized as tokens outside the max position distance 216 in the matching score. Therefore, based on constrained greedy matching using a restricted distance between positions of paired tokens in their respective token sequences, tokens "has" and "been" were not scored as similar (matches). This distance restriction improves contextual accuracy and removes overconfident scoring.

Figure 4:
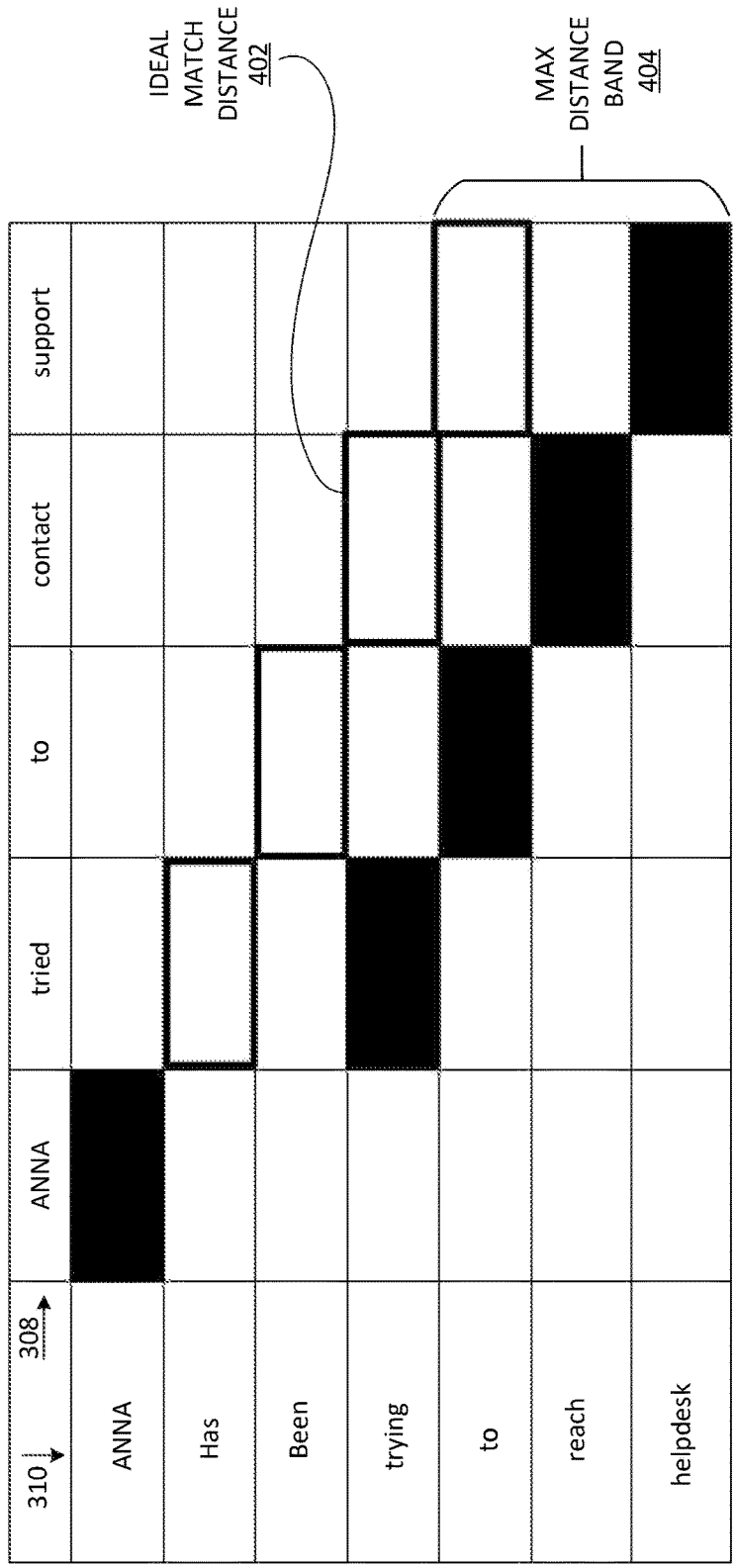
FIG. 4 is a block diagram illustrating a matrix matching sentence tokens, according to some embodiments.

FIG. 4 is a block diagram illustrating a matrix matching sentence tokens, according to some embodiments.

Token matching can be represented as a matrix, where columns correspond to tokens in the first sentence and rows to tokens in another sequence. Ideal token matching would be a one-to-one position match (paired tokens are in the same position in their respective token sequence) as shown by a diagonal of squares 402. However, as shown, token matching is limited to a "band" 404 around the diagonal.

As shown in this example embodiment, a matrix representation includes the sentence tokens 308 and 310, respectively, of sentences 302 and 304 (FIG. 3). In this example, (restricted) token matching is limited to a band (distance of two positions) between each token pairs. While shown for two positions, any distance may be chosen that limits the number of positions based on specific language models.

Figure 5:
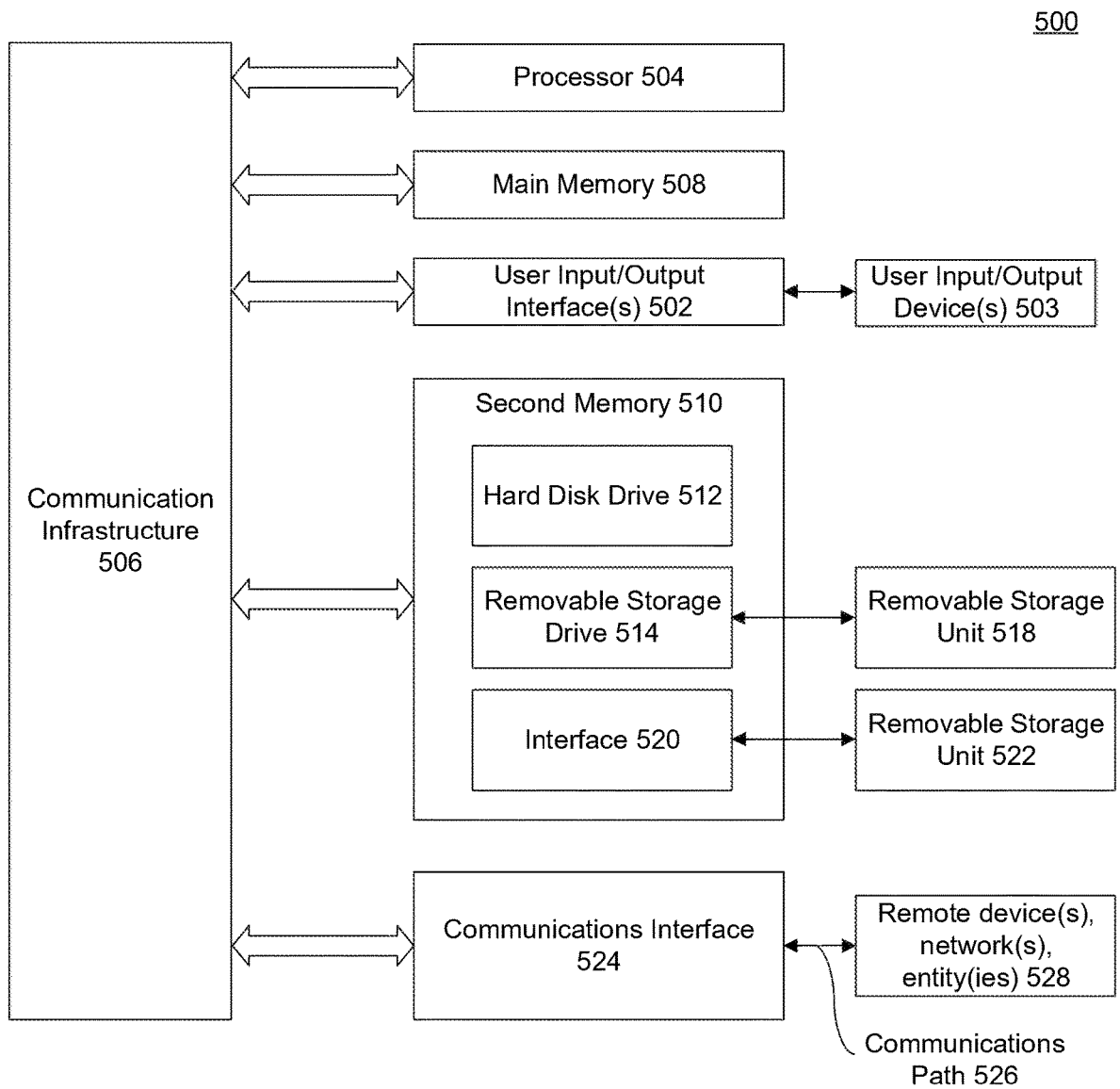
FIG. 5 is an example computer system useful for implementing various embodiments.

Various embodiments can be implemented, for example, using one or more computer systems, such as computer system 500 shown in FIG. 5. Computer system 500 can be used, for example, to implement method 200 of FIG. 2. For example, computer system 500 can replay dynamic SQLs in an ASE workload analyzer. Computer system 500 can be any computer capable of performing the functions described herein.

FIG. 5 is an example computer system useful for implementing various embodiments. Various embodiments can be implemented, for example, using one or more computer systems, such as computer system 500. Computer system 500 can be used, for example, to implement method 300 or any other embodiments described herein. For example, computer system 500 can federate custom resources between an orchestration cluster and a worker cluster. Computer system 500 can further provide server proxy services in a worker cluster, according to some embodiments. Computer system 500 can be any computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for calculating a similarity score, the method comprising:
   an interface module for computer-based speech recognition, the interface module configured to recognize speech by:
   natural language processing, by a natural language processor, a plurality of sentences from natural language queries, the natural language processing comprising:
   receiving, by a tokenization module, a first sentence as a first input;
   receiving, by the tokenization module, a second sentence as a second input, wherein the first sentence and the second sentence originate from the natural language queries;
   tokenizing, by the tokenization module, the first input to generate a first sequence of tokens;
   tokenizing, by the tokenization module, the second input to generate a second sequence of tokens;
   determining, by a token matcher, a similarity of tokens between the first sequence of tokens and the second sequence of tokens to generate token pairs;
   determining, by the token matcher, a distance of relative positions of the token pairs in the first tokenized sequence and the second tokenized sequence, wherein the relative positions comprise positions of each token of the token pairs within the first and second sentences; and
   generating, by the token matcher, a score value that indicates a degree to which the first sentence matches the second sentence based on restricting matches to a maximum value of the distance of relative positions of the token pairs in the first tokenized sequence and the second tokenized sequence, wherein the maximum value of the distance of relative positions of the token pairs is dynamically restricted based on a language's fundamental semantic variability for arrangement, without altering context, and a language model preserving the semantic variability; and wherein the generating comprises bi-directionally determining the distance of the relative positions of the token pairs in the first tokenized sequence and the second tokenized sequence; and wherein the interface module forwards, based on the match, instructions to one or more applications running on one or more computer systems.

2. The method of claim 1, the tokenizing the first input or the second input comprising:

splitting the first sentence or the second sentence into smaller units.

3. The method of claim 2, wherein the smaller units include any of: individual words, terms, numbers or punctuation marks.

4. The method of claim 1, wherein the token pairs exceeding the maximum value are not scored as the match.

5. The method of claim 4, the generating the score value further comprising:

generating the score value based on constrained greedy matching.

6. A system, comprising:

a memory; and an interface module for computer-based speech recognition, the interface module configured to recognize speech and comprising at least one natural language processor coupled to the memory and configured to:

receive a first sentence as a first input;

receive a second sentence as a second input, wherein the first sentence and the second sentence originate from different natural language queries;

tokenize the first input to generate a first sequence of tokens;

tokenize the second input to generate a second sequence of tokens;

determine a similarity of tokens between the first sequence of tokens and the second sequence of tokens to generate token pairs;

determine a distance of relative positions of the token pairs in the first tokenized sequence and the second tokenized sequence, wherein the relative positions comprise positions of each token of the token pairs within the first and second sentences; and generate a score value that indicates a degree to which the first sentence matches the second sentence based on restricting matches to a maximum value of the distance of relative positions of the token pairs in the first tokenized sequence and the second tokenized sequence, wherein the maximum value of the distance of relative positions of the token pairs is dynamically selected based on a language's fundamental semantic variability for arrangement, without altering context and a language model preserving the semantic variability; and wherein the generate a score value includes at least bi-directionally determining the distance of the relative positions of the token pairs in the first tokenized sequence and the second tokenized sequence; and wherein the interface module forwards, based on the match, instructions to one or more applications running on one or more computer systems.

7. The system of claim 6, wherein to tokenize the first input or the second input, the at least one processor is configured to:

split the first sentence or the second sentence into smaller units.

8. The system of claim 7, wherein the smaller units include any of: individual words, terms, numbers or punctuation marks.

9. The system of claim 6, the at least one processor further configured to:

determine token pairs exceeding the maximum value of the distance of relative positions of the token pairs in the first tokenized sequence and the second tokenized sequence.

10. The system of claim 9, wherein the token pairs exceeding the maximum value are not scored as the match.

11. A non-transitory computer-readable device having instructions stored thereon that, when executed by a natural language processing device of an interface module, cause the natural language processing device to perform computer-based speech recognition operations comprising:

receiving a first sentence as a first input;

receiving a second sentence as a second input, wherein the first sentence and the second sentence originate from different natural language queries;

tokenizing the first input to generate a first sequence of tokens;

tokenizing the second input to generate a second sequence of tokens;

determining a similarity of tokens between the first sequence of tokens and the second sequence of tokens to generate token pairs;

determining a distance of relative positions of the token pairs in the first tokenized sequence and the second tokenized sequence, wherein the relative positions comprise positions of each token of the token pairs within the first and second sentences; and generating a score value that indicates a degree to which the first sentence matches the second sentence based on restricting matches to a maximum value of the distance of relative positions of the token pairs in the first tokenized sequence and the second tokenized sequence, wherein the maximum value of the distance of relative positions of the token pairs is dynamically restricted based on a language's fundamental semantic variability for arrangement, without altering context and a language model preserving the semantic variability; and wherein the generating a score value includes at least bi-directionally determining the distance of the relative positions of the token pairs in the first tokenized sequence and the second tokenized sequence; and wherein the interface module forwards, based on the match, instructions to one or more applications running on one or more computer systems.

12. The non-transitory computer-readable device of claim 11, the tokenizing the first input or the second input comprising:

splitting the first sentence or the second sentence into smaller units.

13. The non-transitory computer-readable device of claim 12, wherein the smaller units include any of: individual words, terms, numbers or punctuation marks.

14. The non-transitory computer-readable device of claim 11, wherein the token pairs exceeding the maximum value are not scored as the match.

* * * * *